(12) United States Patent
Joehren (10) Patent No.: US 11,893,448 B1
(45) Date of Patent: Feb. 6, 2024

(54) CONDUCTED CHARGING AND SIGNAL TRANSMISSION IN A ROLL OF ELECTRICAL COMPONENTS ON CARRIER MATERIAL

(71) Applicant: Dialog Semiconductor B.V., s-Hertogenbosch (NL)

(72) Inventor: Michael Joehren, San Jose, CA (US)

(73) Assignee: Dialog Semiconductor B.V., 's-Hertogenbosch (NL)

( * ) Notice: Subject to any disclaimer, the term of this patent is extended or adjusted under 35 U.S.C. 154(b) by 128 days.

(21) Appl. No.: 17/736,322

(22) Filed: May 4, 2022

Related U.S. Application Data (62) Division of application No. 16/866,289, filed on May 4, 2020, now Pat. No. 11,354,556.

(51) Int. Cl.
| | |
|---|---|
| *G06K 7/10* | (2006.01) |
| *H02J 7/00* | (2006.01) |
| *B32B 37/12* | (2006.01) |
| *G06K 19/07* | (2006.01) |
| *B32B 3/26* | (2006.01) |
| *B32B 38/04* | (2006.01) |

(52) U.S. Cl.
CPC .......... *G06K 7/10366* (2013.01); *B32B 3/266* (2013.01); *B32B 37/12* (2013.01); *B32B 38/04* (2013.01); *G06K 19/0704* (2013.01); *H02J 7/0042* (2013.01); *B32B 2038/047* (2013.01); *B32B 2255/205* (2013.01); *B32B 2457/00* (2013.01)

(58) Field of Classification Search
CPC ............ G06K 7/10366; G06K 19/0704; B32B 3/266; B32B 38/04; H02J 7/0042
USPC .......................................................... 235/451
See application file for complete search history.

(56) References Cited

U.S. PATENT DOCUMENTS

| 5,841,285 A | 11/1998 | Bailey |
| 6,058,597 A * | 5/2000 | Shichi .................. H05K 13/087 29/714 |

(Continued)

FOREIGN PATENT DOCUMENTS

| WO | 0030189 A1 | 5/2000 |
| WO | 2018067776 A1 | 4/2018 |

OTHER PUBLICATIONS

U.S. Notice of Allowance, U.S. Appl. No. 16/866,289, Applicant: Michael Joehren, dated Feb. 18, 2022, 8 pages.

*Primary Examiner* — Michael G Lee
*Assistant Examiner* — David Tardif
(74) *Attorney, Agent, or Firm* — Saile Ackerman LLC; Stephen B. Ackerman; Billy Knowles (57) ABSTRACT

A carrier tape has at least two conductive rails affixed at opposite edges of the carrier tape. The purpose of the conductive rails is to provide power to smart labels mounted to the carrier tape for charging the batteries of each of the smart labels or transferring data to or from the smart labels. Holes are pierced into the conductive rails and the carrier tape to make a jagged edge at the backside of each hole in the carrier tape. The jagged edge of each of the holes of the conductive rail and the carrier tape on one layer connects with the conductive rail of the layer immediately adjacent. The smart labels are mounted to the carrier tape with an adhesive. A transport package holds a carrier tape that retains the smart labels and the conductive rails and is configured to transfer charging current or data to the smart labels.

12 Claims, 8 Drawing Sheets

(56) References Cited

U.S. PATENT DOCUMENTS

| | | | |
|---|---|---|---|
| 8,722,233 B2 | 5/2014 | Tucholski | |
| 10,433,470 B2* | 10/2019 | Kato | H05K 13/003 |
| 10,783,424 B1* | 9/2020 | Trivelpiece | G06K 19/07756 |
| 11,354,556 B1* | 6/2022 | Joehren | G06K 19/0776 |
| 2002/0033361 A1 | 3/2002 | Nishioka et al. | |
| 2006/0283467 A1* | 12/2006 | Morinaga | H01L 23/4985 |
| | | | 131/108 |
| 2007/0056683 A1* | 3/2007 | Manes | G06K 19/07749 |
| | | | 156/264 |
| 2007/0222615 A1* | 9/2007 | Yamaguchi | G06K 19/07718 |
| | | | 340/572.7 |
| 2015/0278671 A1* | 10/2015 | Martin | G06K 19/027 |
| | | | 29/601 |
| 2019/0138871 A1* | 5/2019 | Kato | G06K 19/07718 |
| 2021/0134635 A1* | 5/2021 | Kuo | C09J 7/20 |

\* cited by examiner

CONDUCTED CHARGING AND SIGNAL TRANSMISSION IN A ROLL OF ELECTRICAL COMPONENTS ON CARRIER MATERIAL

The present invention is a divisional application that claims priority under 35 U.S.C. § 120 from U.S. patent application Ser. No. 16/866,289, filing date May 4, 2020, which is assigned to a common assignee and incorporated herein by reference in its entirety.

TECHNICAL FIELD

This disclosure generally relates to a carrier tape used for packaging and transporting smart label or tag components. More particularly, the present disclosure is directed to a carrier tape wound on a reel or placed in a rectangular box wherein the carrier tape is electrically connected to the smart label or tag components and an external power source and communication circuits for charging and communicating with the smart label components

BACKGROUND

The smart label or tag (hereinafter smart label) is an ultra-low power internet of things application. The smart label is a computing device that enables the printed labels to be used in the logistics market. Smart labels include integrated circuits and memory powered by an energy storage component such as a battery, capacitor, or supercapacitor and are structured to fit in a plastic or paper package. The plastic or paper packaging has an adhesive to adhere the smart label to goods and materials, such as food, clothing, appliances, electronic equipment (computers, etc.), electronic components, mechanical and automotive components, etc. The smart label enables the good or material on which it is attached to retain pertinent information such as price, storage location, manufacture date, etc. The smart label then can transmit data to and receive data from servers containing data regarding the manufacture, transportation, storage, display, sale, anti-theft protection, etc., of the goods and material. Further, the smart labels may include sensors for logging environmental information such as temperature, acceleration, etc.

The communication for the smart label is generally a radio frequency transmitter or transmitter/receiver through an antenna placed on the plastic or paper package. The communication protocols are a radio frequency identification (RFID) protocol, Bluetooth Low Energy, or other wireless protocols.

Nonelectronic paper or plastic labels or tags for a more substantial volume of industrial and commercial use are typically distributed and used in the form of a roll or as a stack of 'endless' paper in a box or tray. The individual label is either placed on or is part of the carrier tape, for instance, paper or plastic foil. Each label or tag is individually separated from and attached to its target device (package, box, pallet).

SUMMARY

An object of this disclosure is to provide a carrier tape configured to transport smart labels having conductive rails configured to conduct electric current for delivering power to a power source for the smart label.

Another object of this disclosure is to provide a reel or box configured to receive a carrier tape having smart labels adhered to the carrier tape, wherein the carrier tape is configured to have each layer of the carrier tape configured to conduct electric current between layers of the carrier tape on a reel or in a stack in a box.

Another object is to provide a communication and charging system for battery charging and communicating with smart labels packaged on a reel or stacked in a container through conductive rails adhered to the carrier tape.

To accomplish at least one of these objects, a carrier tape has at least two conductive rails that are affixed at two edges of the carrier tape on opposite sides of the smart label. The purpose of the conductive rails is to provide power to each of the smart labels to charge each smart label's batteries or transfer data to or from the smart labels. Holes are pierced into the conductive rails and the carrier tape to make a jagged edge at the backside of each hole in the carrier tape. The jagged edge of each of the holes of the conductive rail and the carrier tape on one layer connects with the conductive rails of the layer immediately adjacent to the one layer. An adhesive is applied to the carrier tape at each location on the carrier tape that is to receive the smart labels. The smart labels are then adhered to the carrier tape.

In other embodiments that accomplish at least one of these objects, a transport package configured to retain a carrier tape onto which smart labels and the conductive rails are adhered. In some embodiments, the transport package is a reel onto which the carrier tape with smart labels and conductive rails is wound. The reel has connectors that receive the charging current for the batteries and the program signal for programming the smart labels. A communication/charging station controls the charging current and transfers the communicating data through the conductive rails to the smart labels. In some embodiments, the carrier tape with smart labels and conductive rails are stacked in a transport package that is a rectangular box or container. The container has connectors that receive the charging current for the batteries and communication signals for the smart labels. A programming/charging station controls the charging current and transfers the programming code through the conductive rails to the smart labels. The container may be a cardboard box, or carton, a plastic case, a metal cassette, or other packages suitable for transport.

In various embodiments that accomplish at least one of these objects, a system is configured for charging the batteries of smart labels and communicating with the application processor of the smart labels. The system includes the reels or containers holding carrier tapes holding smart labels. Each of the reels or containers has terminals in contact with the conductive rails on the edges of the smart labels for transferring current to charge each smart label's battery and communicating with the application processor of each smart label.

In certain embodiments that accomplish at least one of these objects, a method for charging all batteries of smart labels and communicating with the smart labels placed in a transport package begins with forming substrates for holding smart label components. The smart label substrates are composed of polymers laminated with paper, fiberglass, or resin film. The smart label components are mounted to the substrate. The smart label components are a microprocessor, application processor, or a synchronous logic state machine in an application specific integrated circuit, random access memory, read-only memory, power management integrated circuits, and a radio frequency transmitter or transmitter/receiver integrated circuit.

A carrier tape is then formed. The carrier tape is composed of laminated paper or laminated resin films. An adhesive is placed on the smart label substrates and mounted to the carrier tape.

Paper, copper foil, or aluminum foil strips are formed, and an adhesive is placed on the strips. The paper, copper foil, or aluminum foil strips are mounted at opposing edges of the carrier tape. Holes are then pierced at regular intervals in the paper or copper foil strips and the carrier tape on the opposing edges of the carrier tape. In some embodiments, the carrier tape is pre-pierced with the holes. The copper or aluminum foil is then pierced to cause the jagged edges of the foil to extend beneath the bottom of the holes of the carrier tape.

The carrier tape with mounted smart label substrates is placed on a reel or in a fanfold container. The reel or container is connected to a communications or power source to charge the smart label device

DETAILED DESCRIPTION

The communication circuit for the smart label of this disclosure is generally a radio frequency transmitter or transmitter/receiver through an antenna placed on the plastic or paper package. The communication protocols are chosen to be a radio-frequency identification (RFID) protocol, a Bluetooth Low Energy, near field communication (NFC), or other suitable communication protocols.

Active RF-transceiver smart labels require a battery or any other energy storage element such as a capacitor or super capacitor to provide enough power to its radio for communication during its targeted lifetime. Special receiver equipment should be avoided to read the smart labels. The smart labels of this disclosure are structured to use the standard communication protocols, for instance, Bluetooth, IEEE 802.11, or near field communication (NFC). These protocols enable the smart labels to communicate with any smartphone, laptop computer, or tablet computer that is equipped with Bluetooth, IEEE802.1, or NFC.

To achieve the maxim active battery life with the smallest battery possible, the battery for the smart label of this disclosure should be rechargeable while the smart labels are on their transportation reel or stacked in their transportation box.

Recharging labels in such a 'belt' configuration require a simple connectivity scheme that must be cost-efficient, easy to manufacture, produces little to no waste, and is reliable. The connection arrangement of this disclosure permits the charging of the batteries and communication to all integrated circuit elements of the smart labels mounted on the carrier tape.

Figure 1A:
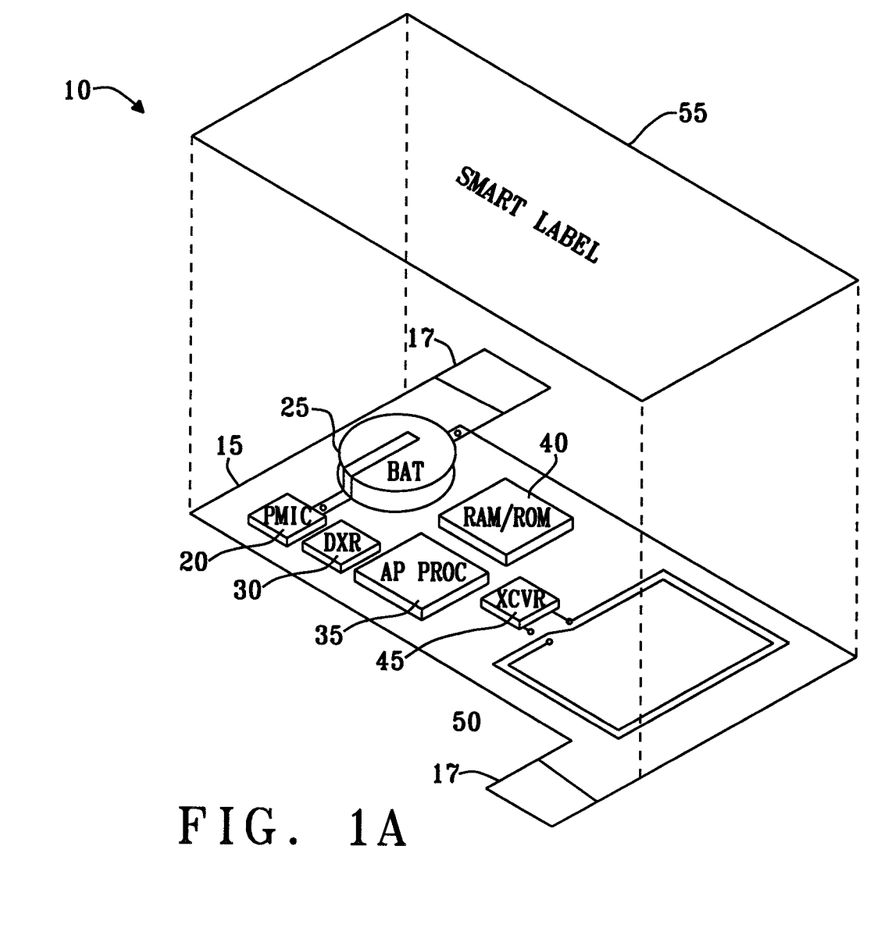
FIG. 1A is a diagram of a smart label embodying the principles of this disclosure.
Figure 1B:
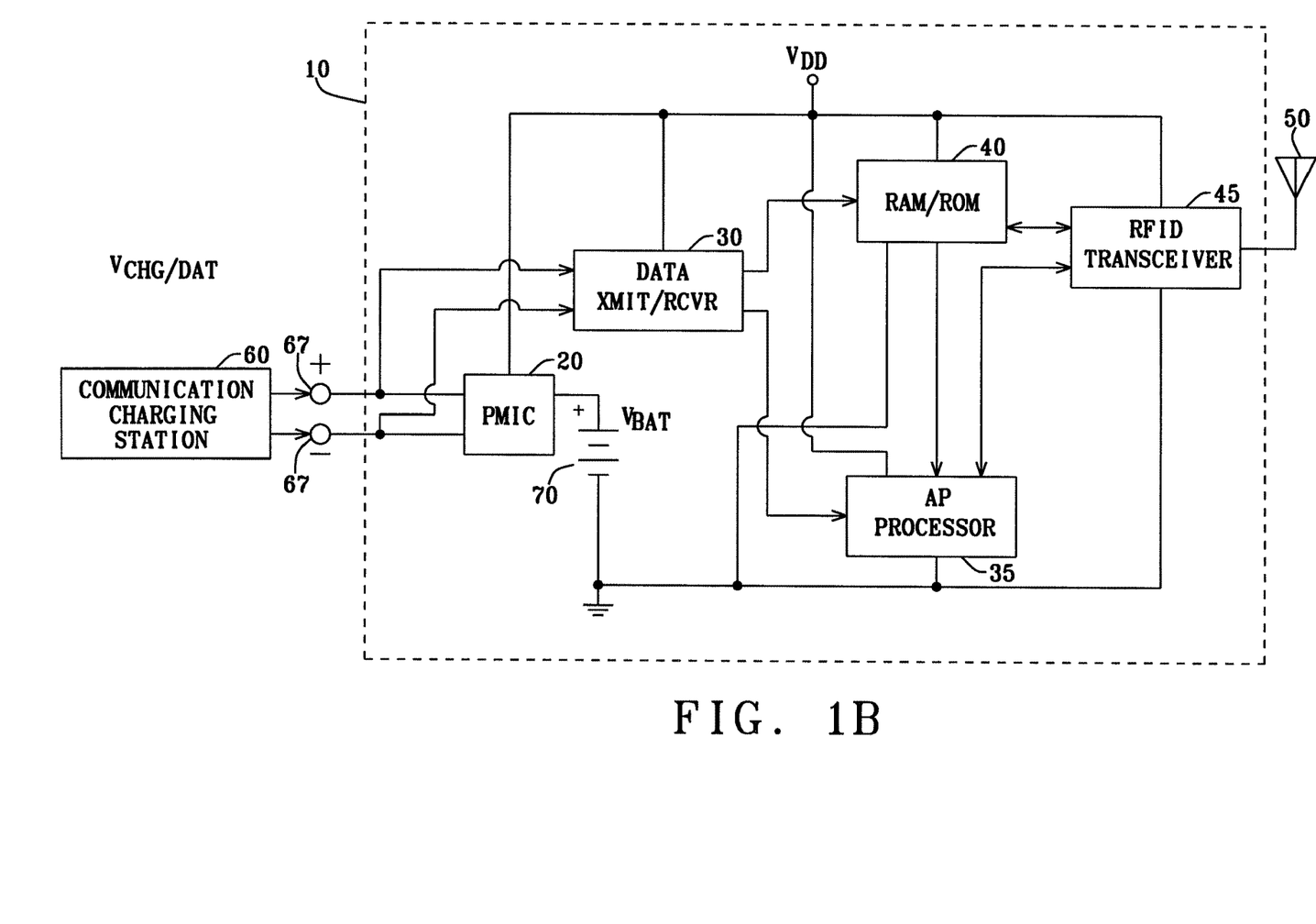
FIG. 1B is a block diagram of a smart label embodying the principles of this disclosure.

FIG. 1A is a diagram of a smart label 10, and FIG. 1B is a block diagram of a smart label 10 embodying the principles of this disclosure. Referring now to FIGS. 1A and 1B, the smart label 10 has a substrate 15 that is currently formed of polymers laminated with paper, fiberglass, or polymer resin film. As the technology improves, the substrate 15 will be strictly multiple layers of paper laminated adhesively with embedded power and signal interconnections. The substrate 15 is composed of one or more layers of laminated polymers. It has signal and power interconnections embedded on the surfaces of each of the one or more layers of the laminated polymers of the substrate 15. The signal and power interconnections are formed with copper foil or conductive inks formed of metal or carbon particles and synthetic resins. The metal particles are formed of copper, nickel, silver, silver-plated copper, or any other suitably conductive metal. An external connection from a communication/charging station 60 (as shown in FIG. 1B) is through the tabs 17. One of the tabs 17 receives a positive voltage, and the other tabs 17 receives a negative voltage or a ground reference voltage. Further, the tabs 17 may receive a differential data communication that is applied between the two tabs 17.

Electronic circuitry is placed on the substrate 15 and secured to the substrate with an adhesive. The signal and power interconnections formed of the conductive inks are connected to the input/output connectors on the integrated circuit chips of the electronic circuitry. The electronic circuitry includes a power management integrated circuit (PMIC) 20. The PMIC 20 is connected to the connector terminals 67 of the smart label 10 that, in turn, is connected to the communication/charging station 60 external to the smart label 10. The PMIC 20 is connected to a battery 70 that is mounted to the substrate 15. The PMIC 20 is connected to the power distribution wiring embedded in the substrate. The PMIC 20 controls the charging and discharging of the battery 70 and develops the power supply voltage $V_{DD}$ for the smart label.

The data transmitter or transmitter/receiver 30 has two inputs connected to the connector terminals 17 of the smart label 10. The two inputs of the data transmitter or transmitter/Receiver 30 form a differential signal input for the data transmitter or transmitter/receiver 30. The data transferred to the data transmitter or transmitter/receiver 30 is timestamp information or other configuration data that is broadcasted to all connected labels or alternately targeted to individual devices. The data is transmitted to the data transmitter or transmitter/receiver 30 using relatively simple communication protocols such as amplitude shift keying (ASK) to modulate the voltage of the charging current from the communication/charging station 60. When higher data rates are required, more sophisticated protocols such as frequency shift keying (FSK) or Orthogonal Frequency Division Multiplexing (OFDM) are used to modulate the voltage of the charging current of the communication/charging station 60.

The outputs of the data transmitter or transmitter/receiver 30 are connected to the application processor 35 and the random access memory (RAM), and the nonvolatile read-only memory (ROM) 40. The application processor 35 executes the necessary commands for the implementation of the routines and processes to perform the function of the smart label 10. These routines and processes will be product database information, product location, and other information appropriate for the logistical handling of the product.

The application processor 35 and the RAM and ROM memory 40 are connected to the radio frequency transmitter or transmitter/receiver integrated circuit 45. The radio frequency transmitter or transmitter/receiver integrated circuit 45 is a circuit that encodes and decodes data received from and transmitted to the central processing system by way of radio frequency transmission. The radio frequency transmission uses communication protocols such as radio-frequency identification (RFID) protocol, a Bluetooth Low Energy, or other known wireless protocols. The radio frequency transmitter or transmitter/receiver integrated circuit 45 transmits and receives the radio frequency transmissions through the antenna 50. The antenna 50 is embedded into the surface of the substrate 15 using the copper foil or conductive inks as described above for the interconnections.

The smart label 10 has an adhesive covering 55 that covers and protects the electronic components of the smart label. The adhesive covering 55 may be paper or maybe an electronic paper using electronic ink, as is known in the art. If the adhesive covering 55 is an electronic paper, it will be able to display product information transferred from the application processor 35.

Figures 2A, 2B:
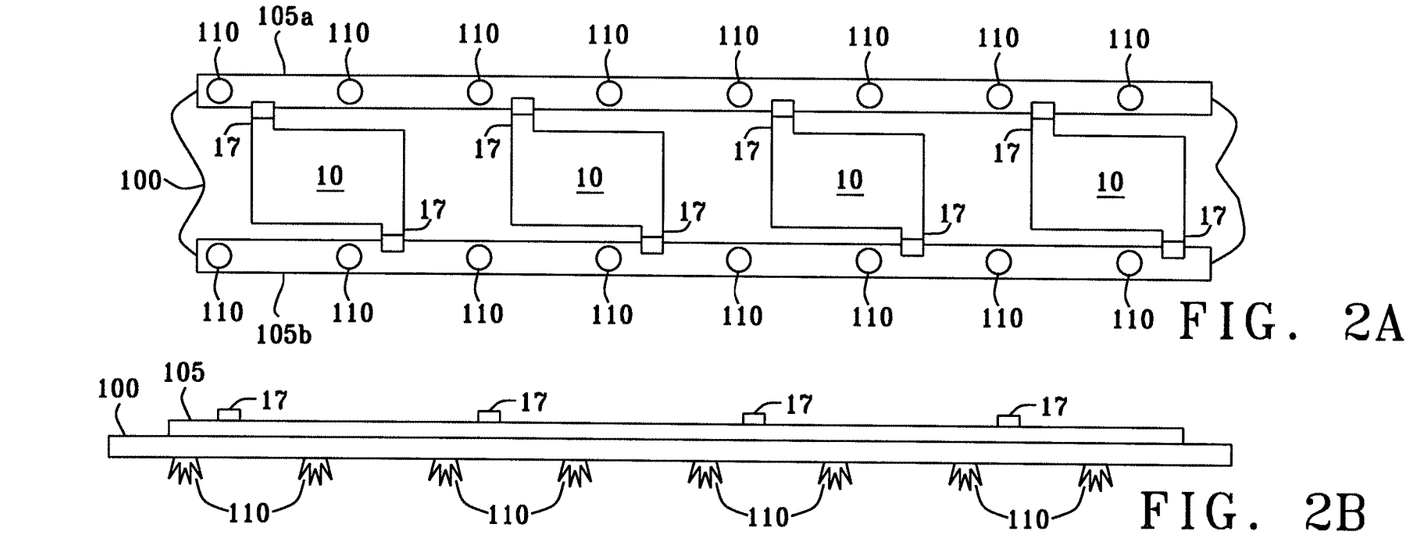
FIGS. 2A and 2B are diagrams illustrating the top and front views of a carrier tape embodying the principles of this disclosure.
Figure 2C:
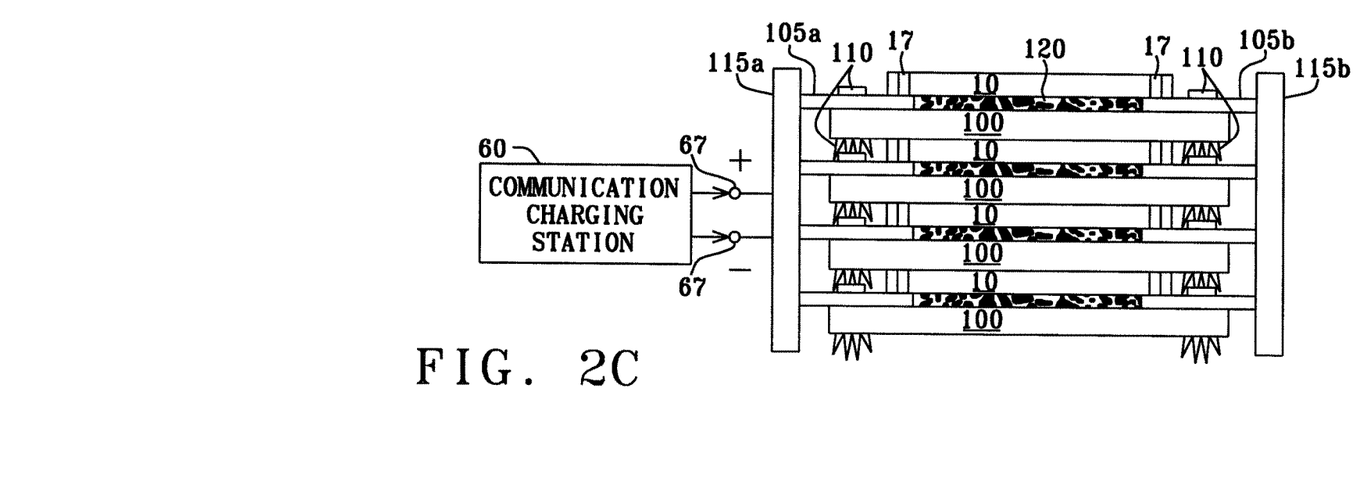
FIG. 2C is a diagram illustrating a side view of multiple layers of one or more carrier tape in a transport package embodying the principles of this disclosure.

FIGS. 2A and 2B are diagrams illustrating the top, front, and end views of a carrier tape 100 embodying the principles of this disclosure. FIG. 2C is a diagram illustrating a side view of multiple layers of one or more carrier tape 100 in a transport package embodying the principles of this disclosure. The carrier tape 100 is formed of laminated paper, laminated resin films, or fiberglass reinforced epoxy. At least two conductive rails 105a and 105b are adhered to the carrier tape 100 with an adhesive. Multiple holes 110 are pierced into the at least two conductive rails 105a and 105b and the carrier tape 100 at regular intervals. The piercing equipment forms the multiple holes 110 and, in doing so, creates jagged edges on the multiple holes 110 as described in more detail hereinafter in FIG. 4. These jagged edges will make contact with the at least two conductive rails 105a and 105b on a carrier tape 100 on a layer beneath the carrier tape 100.

An adhesive 120 of FIG. 2C is placed on the carrier tape 100 between the at least two conductive rails. The smart labels 10 are then placed on the adhesive to be secured to the carrier tape 100. The smart labels 10 are structured as described above and shown in FIGS. 1A and 1B.

The one or more carrier tapes 100 are structured as described above and shown in FIGS. 2A and 2B. The one or more carrier tapes 100 are either rolled onto a reel 135 or stacked within a transport container 145 of FIG. 6 that may be a cardboard box, or carton, a plastic case, a metal cassette, or other packages suitable for stacking the carrier tapes 100 for transport. Two of the conductive rails 105a and 105b are in contact with signal and/or power contact plates 115a and 115b. In a reel configuration, the signal and/or power contact plates 115a and 115b are the side disks 115a and 115b of the reel 135 in FIG. 5. The signal and/or power contact plates 115a and 115b are connected to the connector terminals 67 that are connected to the communication/charging station 60.

Figure 3:
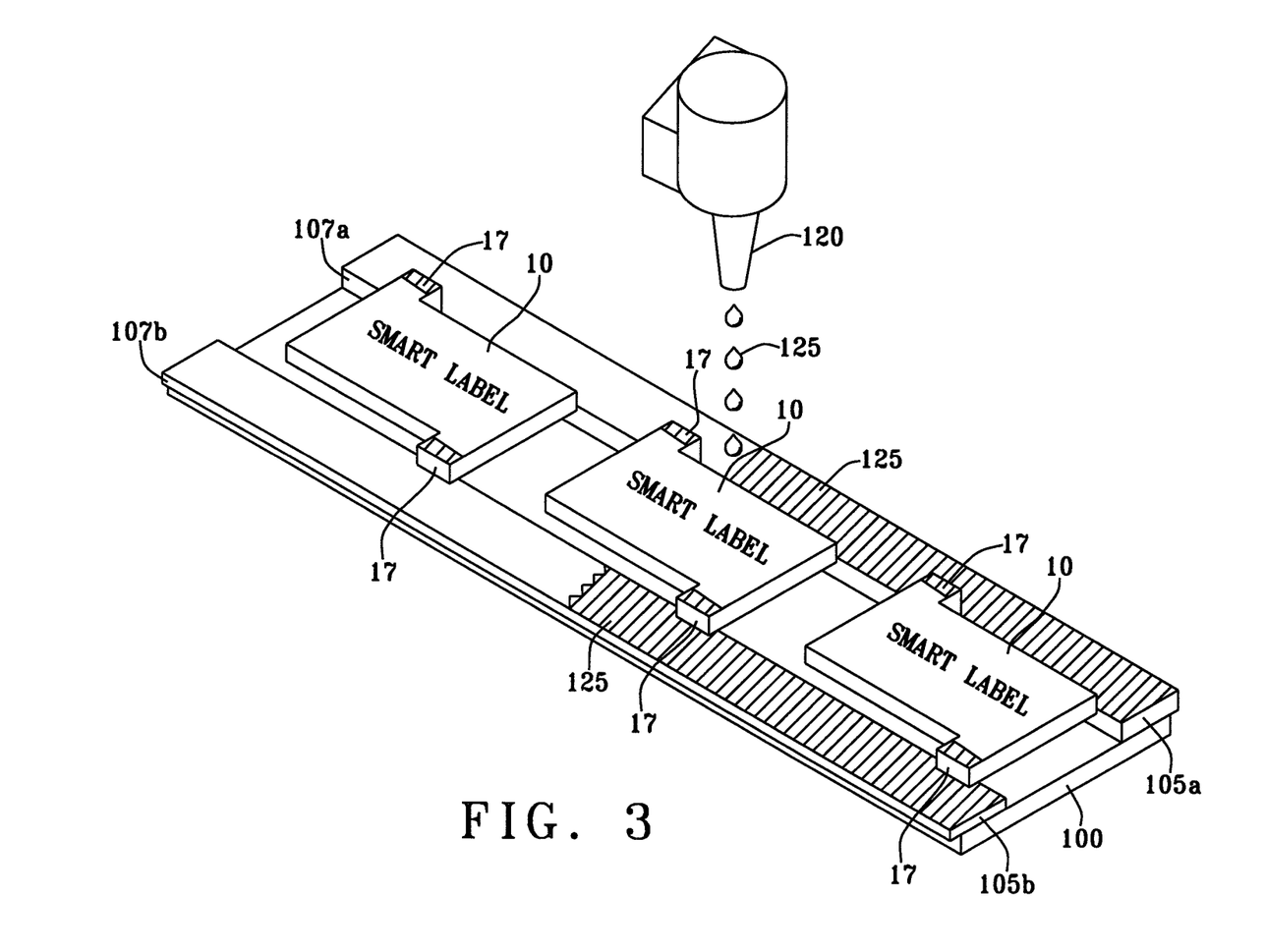
FIG. 3 is a diagram exemplifying depositing a conductive ink on paper strips affixed to the carrier tape embodying the principles of this disclosure.

FIG. 3 is a diagram exemplifying depositing a conductive ink 125 on paper strips affixed to the carrier tape 100 to form the conductive rails 105a and 105b embodying the principles of this disclosure. The carrier tape 100 is structured as described above and in FIGS. 2A, 2B, and 2C. The conductive rails 105a and 105b in this implementation are formed of a laminated paper 107a and 107b. The laminated paper 107a and 107b are mounted on the carrier tape 100. The smart labels 10 are attached as described above for FIG. 2C. An inkjet printing device 120 then applies the ink 125 to the laminated paper 107a and 107b and the tabs 17 on the smart labels 10. Ink 125 flows into the intersection of the conductive rails 105a and 105b and the tabs 17 of the smart labels 10 to effectively connect the tabs 17 to the conductive rails 105a and 105b.

Figure 4:
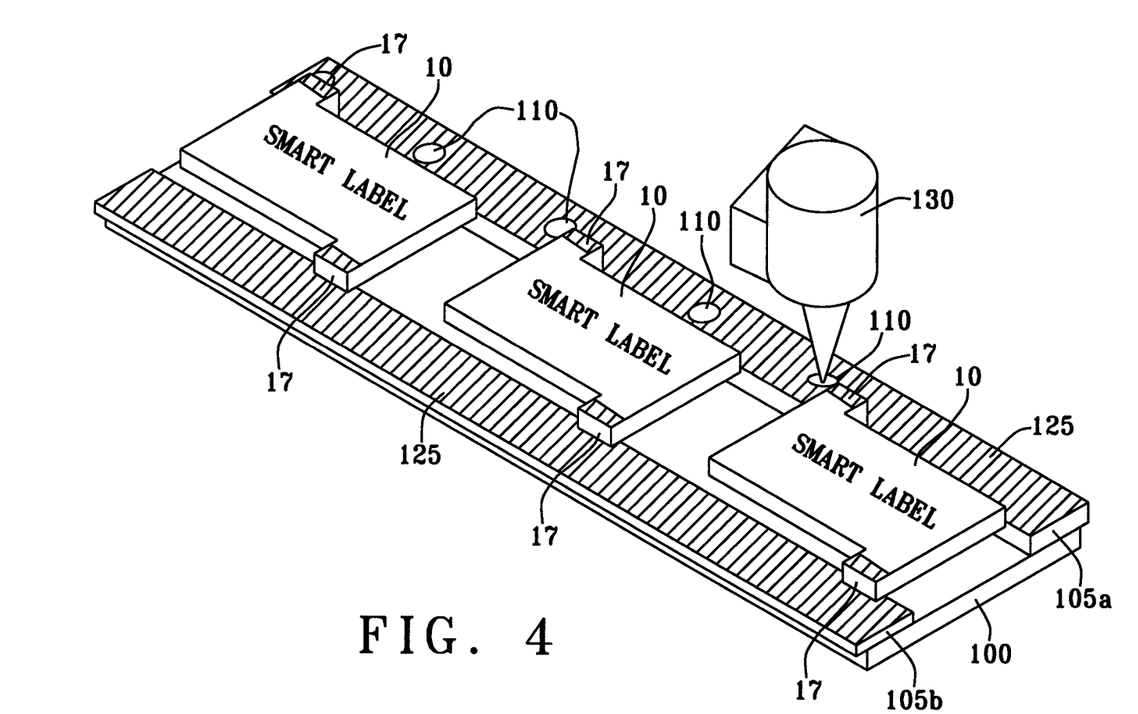
FIG. 4 is a diagram showing the piercing of holes in the conductive rails and the carrier tape for connecting layers of the carrier tape on a reel or stacked in a box embodying the principles of this disclosure.
Figure 5:
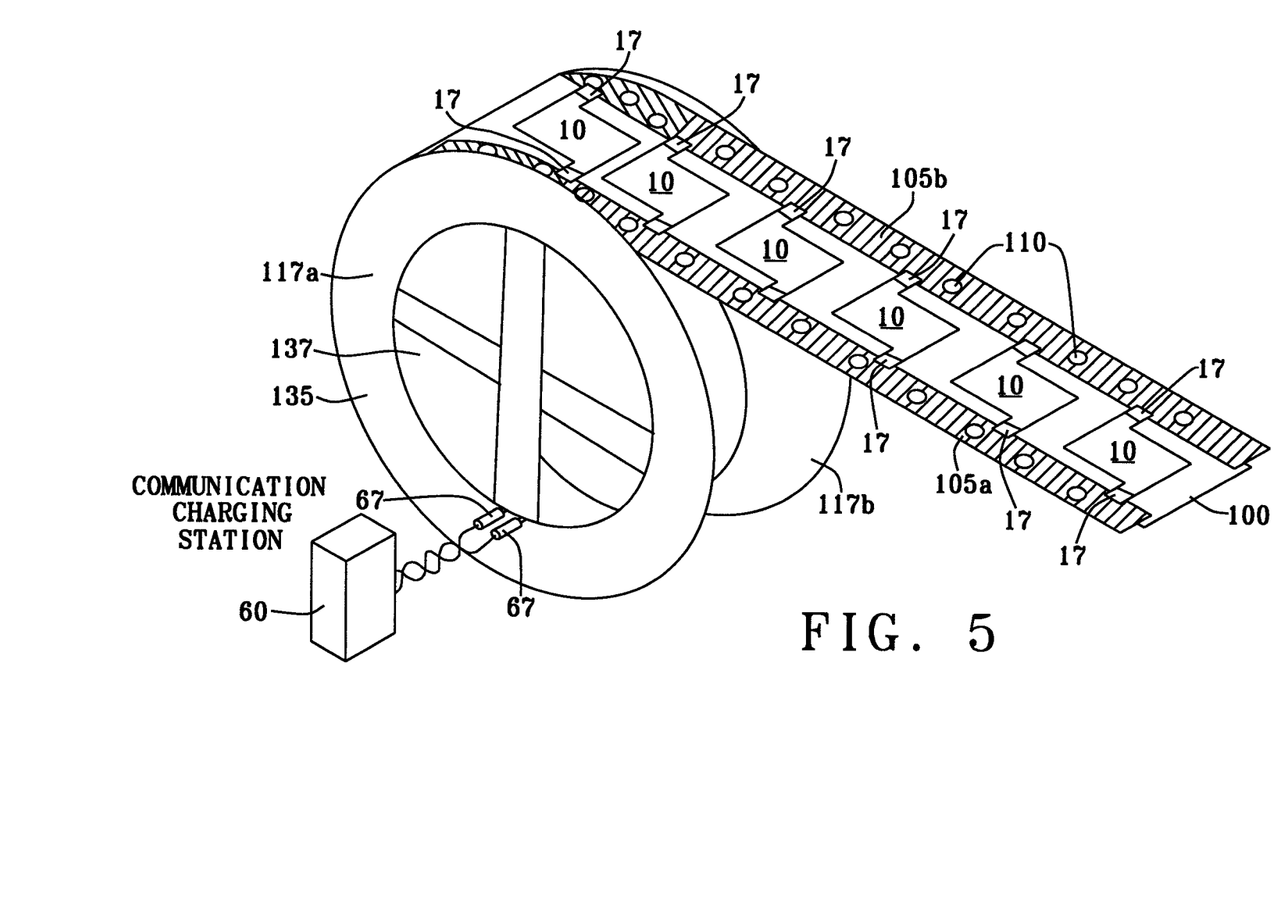
FIG. 5 is a diagram of a reel having a carrier tape with smart label components mounted on it embodying the principles of this disclosure.
Figure 6:
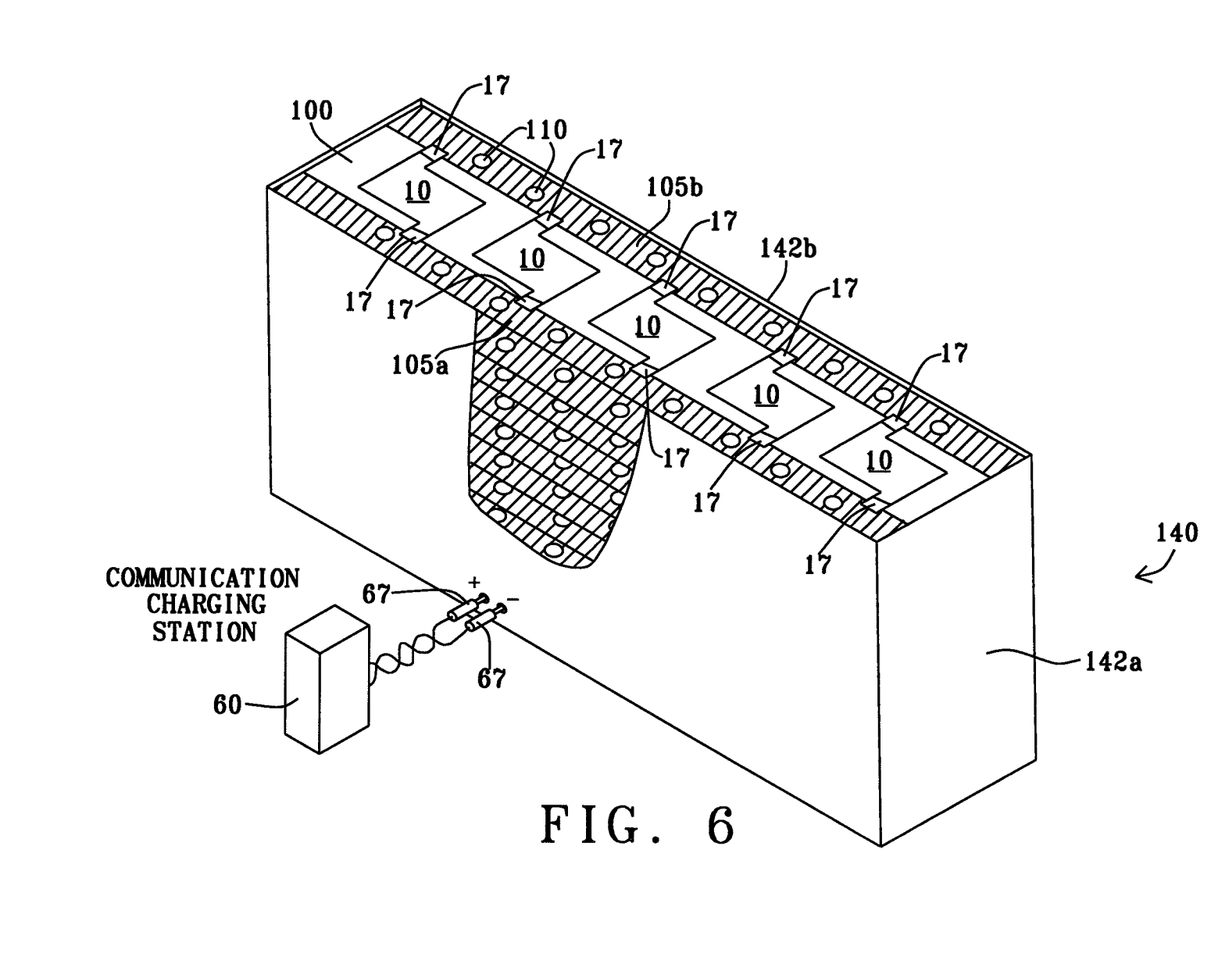
FIG. 6 is a diagram of a transport container enclosing at least one carrier tape with smart labels fan-folded in the transport container embodying the principles of this disclosure.

FIG. 4 is a diagram showing the piercing of holes 110 in the conductive rails 105a and 105b and the carrier tape 100 for connecting layers of the carrier tape 100 on a reel 135 of FIG. 5 or stacked in a transport container 145 of FIG. 6 embodying the principles of this disclosure. The conductive rails 105a and 105b are adhesively mounted to the carrier tape 100. The conductive rails 105a and 105b may be either copper foil, aluminum foil, or the laminated paper 107a and 107b with conductive ink of FIG. 3. The smart labels 10 are mounted as described above for FIG. 2C. A hole piercing apparatus 130 produces the holes 110 into the conductive rails 105a and 105b. The hole piercing apparatus 130 is designed with a pointed conical form for piercing the carrier tape 100 and the conductive rails 105a and 105b to form jagged edges on the multiple holes 110 such that these jagged edges will make contact with the conductive rails 105a and 105b on a carrier tape 100 on a layer beneath the carrier tape 100, as described above for FIG. 2C.

In embodiments where the conductive rails 105a and 105b are copper or aluminum foil, the carrier tape 100 is pre-pierced with the holes 110. The conductive rails 105a and 105b formed of copper or aluminum foil are then pierced to cause the jagged edges of the foil to extend beneath the bottom of the holes 110 of the carrier tape 100.

In other embodiments where the conductive rails 105a and 105b are a paper substrate with conductive ink, the paper substrate is punctured to form the holes 100 prior to the deposition of the conductive ink. The conductive ink is then applied to the paper substrate to form the conductive rails 105a and 105b. The conductive ink is chosen to have a viscosity to form droplets at the bottom edges of the holes.

FIG. 5 is a diagram of a reel 135 having a carrier tape 100 with the conductive rails 105a and 105b and the smart labels 10 mounted on it. The carrier tape 100 is wrapped around a hub 137. The hub is a nonconductive material or coated with a nonconductive material to prevent shorting the communication signals and charging current to the two flanges 117a and 117b of the reel 135. The two conductive rails 105a and 105b are in contact with signal and/or power contact plates 115a and 115b of FIG. 2c that are the flanges 117a and 117b of the reel 135. The flanges 117a and 117b are configured to transfer the communication signals and charging current from the communication/charging station 60 through the connector terminals 67 to the signal and/or power contact plates 115a and 115b and then to the smart labels 10. The communication/charging station 60 provides the charging current for the batteries 25 and the communication signals for the data transmitter or transmitter/receiver 30 of FIGS. 1A and 1B.

In some embodiments, The flanges 117a and 117b of the reel 135 are constructed of a nonconductive material. The sides of flanges 117a and 117b facing the side facing the carrier tape 100 are coated with the copper or aluminum foil or with the conductive ink and thus act as the signal and/or power contact plates 115a and 115b. The conductive rails 105a and 105b are thus extended to contact the flanges 117a and 117b with the copper or aluminum foil or the conductive ink. The size of the flanges 117a and 117b improve the conductivity of the path from the communication/charging station 60 to the smart labels 10 on the carrier tape 100.

FIG. 6 is a diagram of a transport container 145 enclosing at least one carrier tape 100 with smart labels 10 fan-folded or layered in the box embodying the principles of this disclosure. In this implementation, the transport container is a box or carton 145 formed of cardboard, high-density plastic, or any other material suitable for the transport and storage of carrier tape 100 for the application of the smart labels 10. The two sides 142a and 142b are structured to act as the signal and/or power contact plates 115a and 115b. The signal and/or power contact plates 115a and 115b are connected to the connector terminals 67 that are connected to the communication/charging station 60. The communication/charging station 60 provides the charging current for the batteries 25 and the communication signals for the data transmitter or transmitter/receiver 30 of FIGS. 1A and 1B.

In other embodiments, The two sides 142a and 142b of the container 145 are constructed of a nonconductive material. The inside of the two sides 142a and 142b facing the side facing the carrier tape 100 are coated on the with the copper or aluminum foil or with the conductive ink and thus act as the signal and/or power contact plates 115a and 115b. The conductive rails 105a and 105b are thus extended to contact the two sides 142a and 142b with the copper or aluminum foil or the conductive ink. The size of the two sides 142a and 142b improve the conductivity of the path from the communication/charging station 60 to the smart labels 10 on the carrier tape 100.

Figure 7:
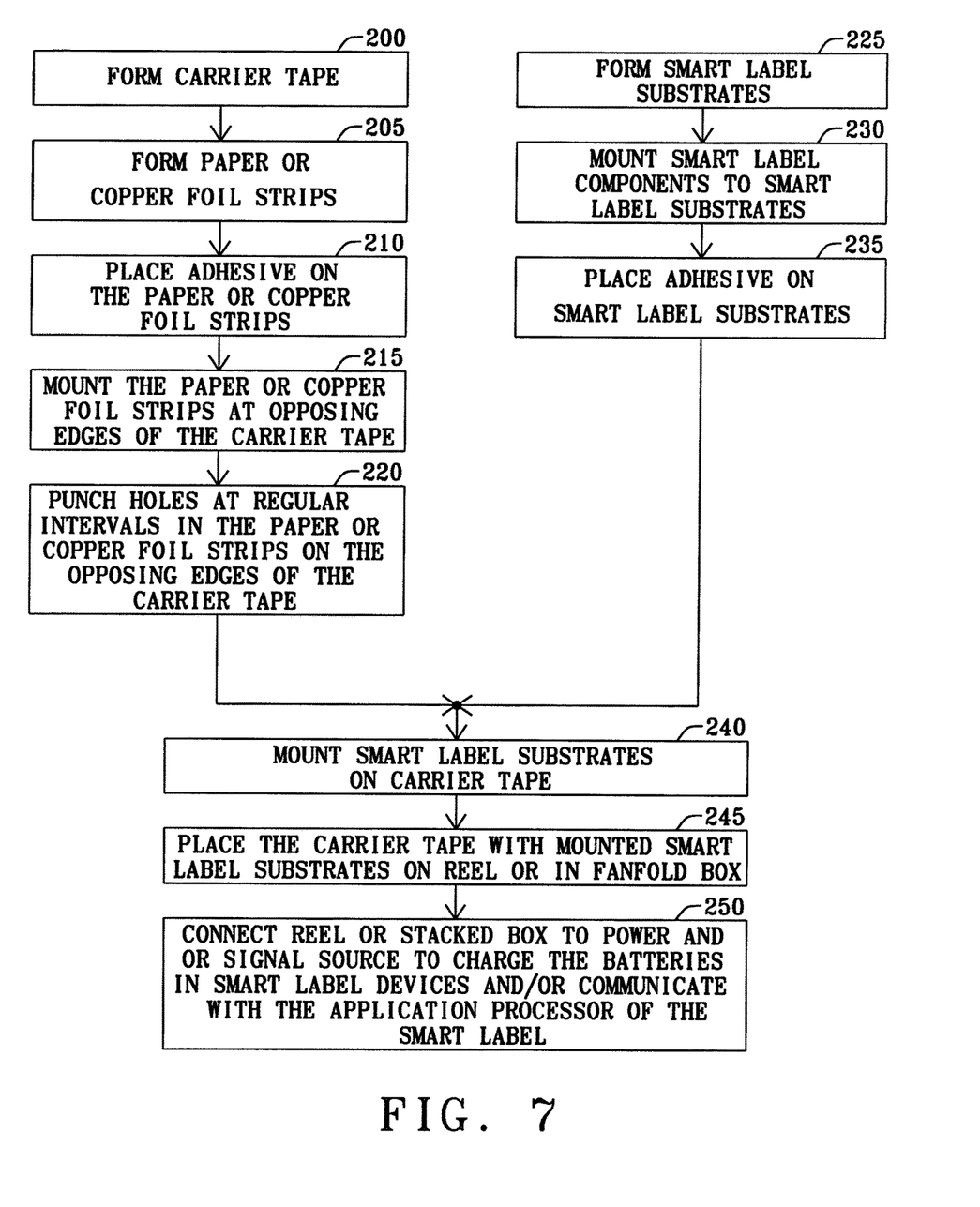
FIG. 7 is a flowchart of a method for forming a carrier tape with smart labels mounted on it with connections for communicating and charging the smart labels embodying the principles of this disclosure.

FIG. 7 is a flowchart of a method for forming a carrier tape with smart labels mounted on it with connections for communicating and charging the smart labels embodying the principles of this disclosure. The method begins with forming (Box 200) a carrier tape. The carrier tape is structured as the feature 100 as described in FIGS. 2A and 2B. Paper or copper foil strips are formed (Box 205) as conductive rails. The paper or copper foils strips are structured as the conductive rails 105, 105a, and 105b of FIGS. 2A and 2B. The paper strips 107a and 107b of FIG. 3 are coated with a conductive ink 125 dispensed by an inkjet printer 120 to form the paper conductive rails 105, 105a, and 105b.

Adhesive is placed (Box 210) on the paper or copper foil strips 105, 105a, and 105b and are mounted (Box 215) at opposing edges to the carrier tape 100. A hole piercing apparatus 130 of FIG. 4 pierces (Box 220) the holes 110 into the conductive rails 105a and 105b. The hole piercing apparatus 130 forms jagged edges on the multiple holes 110 such that these jagged edges will make contact with the conductive rails 105a and 105b on a carrier tape 100 on a layer beneath the carrier tape 100, as described above for FIG. 2C.

Refer now, additionally, to FIGS. 7, 1A, and 1B. Independent of forming the carrier tape 100, the smart label substrate 15 is formed (Box 225) of polymers laminated with paper, fiberglass, or polymer resin film. The substrate 15 is composed of one or more layers of the laminated polymers. The substrate 15 has signal and power interconnections embedded on the surfaces of each of the one or more layers of the laminated polymers of the substrate 15 as described in FIG. 1A. The electronic components (battery 25, power management integrated circuit 20, data transmitter or transmitter/receiver 30, application processor 35, random access memory (RAM) and the nonvolatile read-only memory (ROM) 40, radio frequency transmitter or transmitter/receiver integrated circuit 45, and antenna 50) are mounted (Box 230) to the smart label substrate 15 using appropriate techniques that are known in the art as described in FIGS. 1A and 1B.

An adhesive is applied (Box 235) to the smart label substrate 15 with the mounted components 20, 25, 30, 35, 40, 45, and 50 as described above. The smart label 10 is then mounted (Box 240). The above is performed for all carrier tapes 100 and all smart labels 10 mounted to the carrier tapes 100 for transport. The carrier tapes 100 with the mounted smart labels 10 are wound (Box 245) on a reel 135, as shown in FIG. 5, or fan-folded in a stack and placed in a box or container 145, as described in FIG. 6. The reel 135 or the box or container 145 are connected 250 to a communication/charging station 60 through the connectors 67 of FIGS. 5 and 6 for communicating with application processor 35 of the smart labels 10 and/or charging the batteries 25 through the power management integrated circuit 20 of the smart labels 10.

While this disclosure has been particularly shown and described with reference to the preferred embodiments thereof, it will be understood by those skilled in the art that various changes in form and details may be made without departing from the spirit and scope of the disclosure. It should be noted that the batteries 25 of FIGS. 1A and 1B may be replaced with energy storage devices such as capacitors, supercapacitors, or other related energy storage devices.

What is claimed is:

1. A carrier tape comprising:
   a plurality of labels or tags comprising energy storage devices, computing devices, memory devices, and radio frequency devices for transmitting product information for articles onto which the labels or tags are attached;
   a first conductive rail and a second conductive rail adhered at opposite edges of the carrier tape and configured to conduct electric current for delivering power to the energy storage device within the smart label and configured to transfer a communication signal to the plurality of labels or tags; and
   a plurality of holes placed at intervals on the first and second conductive rails and pierced through the first and second conductive rails and the carrier tape and having jagged edges at a side of the carrier tape opposite the plurality of labels or tags.

2. The carrier tape of claim 1, wherein the first and second conductive rails are arranged so that when the carrier tape is rolled on a reel or folded for placement in a container, a conductive path is formed along an axis substantially perpendicular to the length of the tape.

3. The carrier tape of claim 1, wherein a communication/charging source is connected such that the electric current and/or the communication signal are transferred to the first and second conductive rails and thus to the plurality of labels or tags.

4. The carrier tape of claim 1, wherein the first and second conductive rails have an adhesive applied to one surface of the first and second conductive rails for adhering the first and second conductive rails to the opposite edges of the carrier tape.

5. The carrier tape of claim 1, wherein the plurality of holes placed at intervals through the first and second conductive rails, and the carrier tape are placed at uniform intervals.

6. A method for forming a system for charging all batteries of electronic labels or tags and communicating with an application processor of the electronic labels or tags, comprising the steps of:
forming at least one carrier tape;
forming at least two conductive rails;
adhesively mounting the at least two conductive rails at opposite edges of the at least one carrier tape with a portion hanging over the opposite edges;
piercing a plurality of holes in the carrier tape through the at least two conductive rails at intervals;
forming substrates for electronic labels or tags;
mounting electronic components upon the substrate to assemble the electronic labels or tags;
adhesively mounting the electronic labels or tags on the carrier tape;
placing the at least one carrier tape with the mounted at least two conductive rails and the electronic labels or tags in or on a transport apparatus;
providing a transport apparatus for holding the carrier tape with the mounted at least one conductive rail and the electronic labels or tags;
connecting the transport apparatus to a communication/charging station through connectors affixed to the transport apparatus for communicating with an application processor of the electronic labels or tags and for charging the batteries through a power management integrated circuit of the electronic labels or tags.

7. The method of claim 6, wherein piercing the plurality of holes comprises the step of placing the plurality of holes at uniform intervals through the first and second conductive rails and the carrier tape.

8. The method of claim 6, wherein piercing of holes causes the plurality of holes to form jagged edges on the multiple holes such that these jagged edges will make contact with the conductive rails on a carrier tape on a layer beneath the carrier tape.

9. The method of claim 6, wherein providing the transport apparatus comprises the steps of:
providing a reel formed by the steps of:
providing a first flange and a second flange configured to conduct a charging current to the energy storage device within the electronic labels or tags and transferring a communication signal to an application processor within each of the plurality of labels or tags;
providing a hub;
attaching the hub at a central section of the first flange and the second flange to separate the first and second flanges and hold the carrier tape holding the electronic labels and tags, wherein the hub is formed of a nonconductive material or coated with a nonconductive material to prevent shorting the communication signal and charging current to the two flanges;
providing at least two signal or power contact plates;
connecting the at least two signal or power contact plates to the first flange and the at least one of the signal or power contact plates to the second flange, wherein the signal or power contact plates transfer the communication signal and charging current to the electronic labels and tags.

10. The method of claim 6, wherein providing the transport apparatus comprises the steps of:
providing a rectangular container configured to hold a carrier tape holding electronic labels or tags, wherein configuring the rectangular container comprises the steps of:
forming a first side of the rectangular container and a second side of the rectangular container,
configuring the first side of the rectangular container and the second side of the rectangular container for conducting a charging current to the energy storage device within the electronic labels or tags and transferring a communication signal to an application processor within each of the plurality of labels or tags,
providing a third side and a fourth side of the rectangular container,
attaching the third side and the fourth side to the first and second sides of the rectangular container for forming a rectangular shape of the rectangular container;
attaching a bottom to the first, second, third, and fourth sides;
attaching at least two signal or power contact plates to the first and second sides of the rectangular container,
connecting at least one of the signal or power contact plates to the first side of the rectangular container,
connecting at least one of the signal or power contact plates to the second side of the rectangular container, wherein the signal or power contact plates transfer the communication signal and charging current to the electronic labels and tags,
providing a communication/charging station configured to provide the charging current and the communication signals for transfer to the electronic labels or tags,
attaching the third side, the fourth side, and the bottom of the rectangular attached to edges of the first side and the second side of the rectangular container to separate the first and second sides for retaining the carrier tape holding the electronic labels and tags, and
forming the rectangular container of a nonconductive material or coated with a nonconductive material to prevent shorting the communication signal and charging current to at least two of the signal or power contact plates.

11. The method of claim 9 wherein providing the at least two signal or power contact plates attached to the first and second flanges of the reel comprises the step of forming a coating of copper or aluminum foil or conductive ink on an inside surface of the reel adjacent to the first and second conductive rails.

12. The method of claim 10 wherein providing the at least two signal or power contact plates attached to the first and second sides of the rectangular container comprises the step of forming a coating of copper or aluminum foil or conductive ink on the first and second sides of the rectangular container adjacent to the first and second conductive rails.

* * * * *